US007550026B2

(12) United States Patent
Hayakawa

(10) Patent No.: US 7,550,026 B2
(45) Date of Patent: Jun. 23, 2009

(54) HONEYCOMB FILTER

(75) Inventor: Syuhei Hayakawa, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 15 days.

(21) Appl. No.: 11/717,042

(22) Filed: Mar. 13, 2007

(65) Prior Publication Data

US 2007/0169453 A1 Jul. 26, 2007

Related U.S. Application Data

(63) Continuation of application No. PCT/JP2006/319041, filed on Sep. 26, 2006.

(30) Foreign Application Priority Data

Sep. 28, 2005 (JP) ............................. 2005-282517

(51) Int. Cl.
*B01D 46/00* (2006.01)
*F01N 3/022* (2006.01)

(52) U.S. Cl. ................. 55/523; 55/282.3; 55/385.3; 55/428; 55/484; 55/524; 55/DIG. 5; 55/DIG. 10; 55/DIG. 30; 60/299; 60/311; 428/116

(58) Field of Classification Search ............... 55/282.2, 55/282.3, 385.3, 482, 483, 484, 523, 524, 55/DIG. 5, DIG. 10, DIG. 30; 60/297, 299, 60/300, 303, 311; 428/116, 117, 118; 264/628, 264/630, 631, DIG. 48
See application file for complete search history.

(56) References Cited

U.S. PATENT DOCUMENTS

| 4,364,760 | A |   | 12/1982 | Higuchi et al. |
| 4,568,402 | A |   | 2/1986  | Ogawa et al.   |
| 5,720,787 | A | * | 2/1998  | Kasai et al. ................... 55/523 |
| 5,914,187 | A | * | 6/1999  | Naruse et al. .................. 55/523 |
| 6,669,751 | B1 |   | 12/2003 | Ohno et al. |
| 7,008,461 | B2 | * | 3/2006  | Kuki et al. ................. 55/282.3 |
| 7,033,452 | B2 | * | 4/2006  | Yamada et al. ................ 55/523 |
| 7,297,175 | B2 | * | 11/2007 | Miwa .......................... 55/523 |
| 7,329,300 | B2 | * | 2/2008  | Ichikawa ..................... 55/523 |
| 2002/0185787 | A1 |   | 12/2002 | Miyakawa |
| 2004/0055265 | A1 |   | 3/2004  | Ohno et al. |

(Continued)

FOREIGN PATENT DOCUMENTS

EP      1 403 231      3/2004

(Continued)

OTHER PUBLICATIONS

European Search Report, dated Mar. 15, 2007.

(Continued)

*Primary Examiner*—Jason M Greene
(74) *Attorney, Agent, or Firm*—Finnegan, Henderson, Farabow, Garrett & Dunner LLP

(57) ABSTRACT

A honeycomb filter includes at least one pillar-shape honeycomb structured body including a plurality of cells partitioned by partitions, and plugs for sealing upstream openings of a plurality of first cells selected from the plurality of cells and for sealing downstream openings of a plurality of second cells selected from the plurality of cells. Each of the plugs is formed of a material having a greater total content of aluminum, iron, boron, silicon, and free carbon than a material forming the honeycomb structured body.

19 Claims, 8 Drawing Sheets

U.S. PATENT DOCUMENTS

| | | | |
|---|---|---|---|
| 2004/0131772 A1 | 7/2004 | Yamada et al. | |
| 2004/0161596 A1 | 8/2004 | Taoka et al. | |
| 2005/0076626 A1 | 4/2005 | Kudo et al. | |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2005/0274096 A1 | 12/2005 | Yamada et al. | |
| 2005/0274097 A1* | 12/2005 | Beall et al. | 55/523 |
| 2006/0021310 A1 | 2/2006 | Ohno et al. | |
| 2006/0029769 A1* | 2/2006 | Ichikawa et al. | 264/630 |
| 2006/0051556 A1 | 3/2006 | Ohno et al. | |
| 2006/0159602 A1 | 7/2006 | Ohno et al. | |
| 2006/0166820 A1 | 7/2006 | Ogyu et al. | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0230732 A1 | 10/2006 | Kunieda | |
| 2006/0272306 A1* | 12/2006 | Kirk et al. | 55/523 |
| 2007/0020155 A1 | 1/2007 | Ohno et al. | |
| 2007/0068128 A1 | 3/2007 | Oshimi et al. | |
| 2007/0128405 A1 | 6/2007 | Sakaguchi et al. | |
| 2007/0130897 A1 | 6/2007 | Sakaguchi et al. | |
| 2007/0178275 A1 | 8/2007 | Takahashi | |
| 2007/0196620 A1 | 8/2007 | Ohno et al. | |
| 2007/0212517 A1 | 9/2007 | Ohno et al. | |
| 2007/0293392 A1 | 12/2007 | Ohno et al. | |

FOREIGN PATENT DOCUMENTS

| | | | |
|---|---|---|---|
| EP | 1 418 032 | | 5/2004 |
| EP | 1 570 893 | | 9/2005 |
| EP | 1 632 657 A1 | | 3/2006 |
| EP | 1 679 109 A1 | | 7/2006 |
| EP | 1 696 109 | | 8/2006 |
| JP | 59-54682 | | 3/1984 |
| JP | 1-194916 | | 4/1989 |
| JP | 1-194916 | | 8/1989 |
| JP | 1-258715 | | 10/1989 |
| JP | 2-53083 | | 11/1990 |
| JP | 10-299454 | | 11/1998 |
| JP | 2002-248311 | | 9/2002 |
| JP | 2003-047812 | | 2/2003 |
| JP | 2004-168030 | | 6/2004 |
| JP | 2005-12537 | | 5/2005 |
| JP | 2005-123237 | * | 5/2005 |
| JP | 2005-125237 | | 5/2005 |
| JP | 2005-125318 | | 5/2005 |
| JP | 2005-349269 | | 12/2005 |
| WO | WO 2006/035822 A1 | | 4/2006 |
| WO | WO 2006/035823 A1 | | 4/2006 |
| WO | WO 2006/041174 A1 | | 4/2006 |
| WO | WO 2006/057344 A1 | | 6/2006 |
| WO | WO 2006/070504 A1 | | 7/2006 |
| WO | WO 2006/082938 A1 | | 8/2006 |
| WO | WO 2006/082940 A1 | | 8/2006 |
| WO | WO 2006/087932 A1 | | 8/2006 |
| WO | WO 2006/117899 A1 | | 11/2006 |

OTHER PUBLICATIONS

U.S. Appl. No. 11/760,037.
U.S. Appl. No. 11/927,091.
U.S. Appl. No. 11/874,790.
U.S. Appl. No. 11/851,300.
U.S. Appl. No. 11/925,459.
U.S. Appl. No. 11/932,469.
English Translation of International Preliminary Report on Patentability dated Apr. 10, 2008 regarding International Application No. PCT/JP2006/319041 (7 pgs.).

* cited by examiner

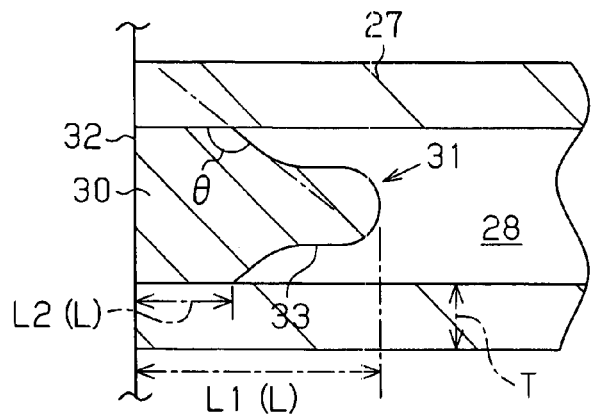
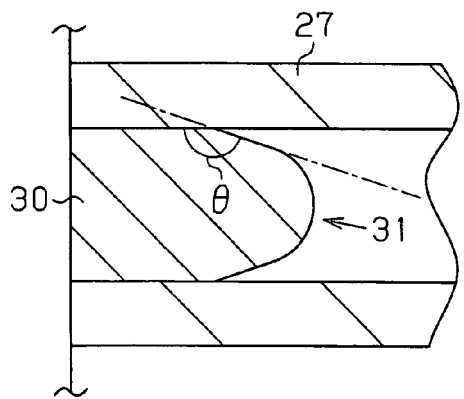
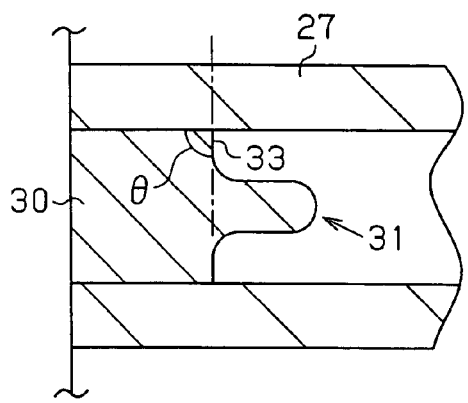
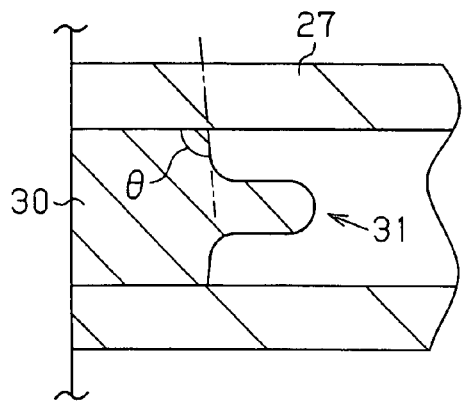
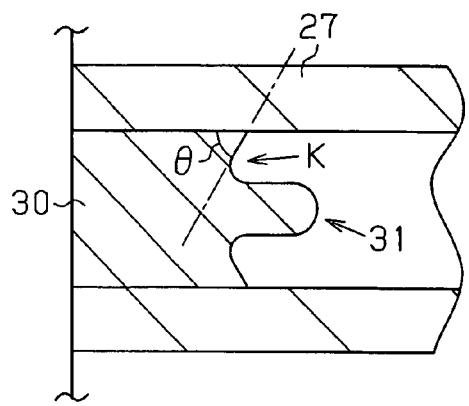

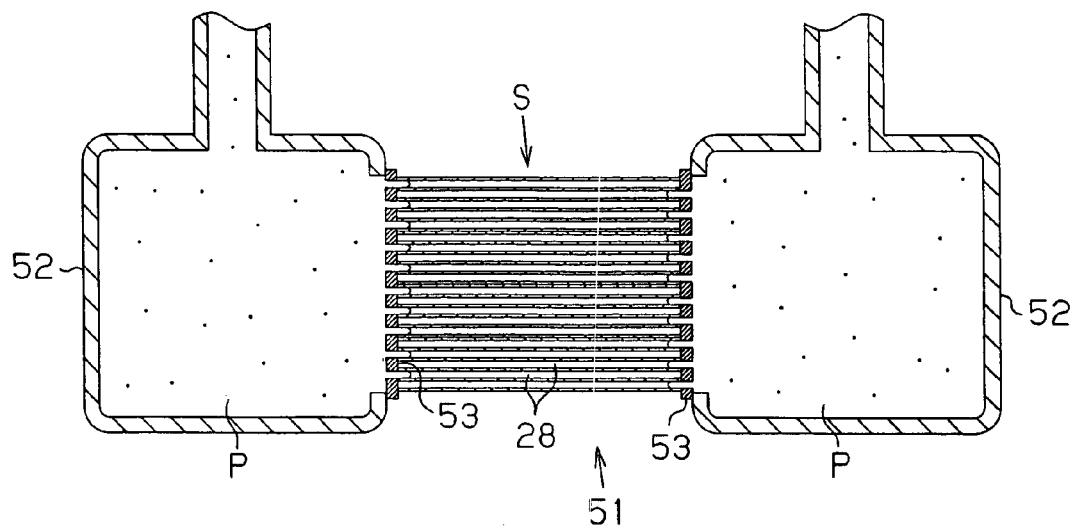
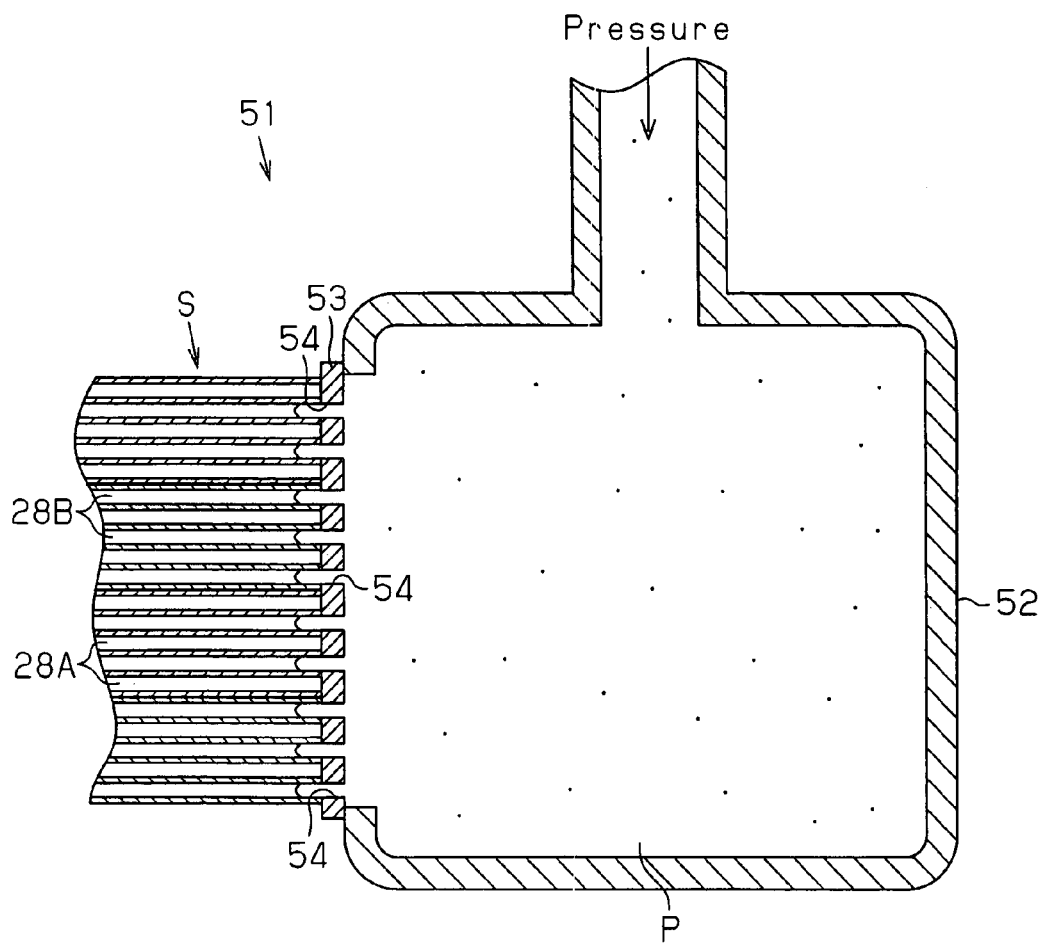

HONEYCOMB FILTER

CROSS-REFERENCE TO RELATED APPLICATIONS

This non-provisional application is a continuation application of and claims the benefit of International Application No. PCT/JP2006/319041, filed on Sep. 26, 2006, which is based upon and claims the benefit of priority from prior Japanese Patent Application No. 2005-282517, filed on Sep. 28, 2005. The entire contents of both of the prior applications are incorporated herein by reference.

BACKGROUND OF THE INVENTION

The present invention relates to a honeycomb filter used to capture and eliminate particulate matter or the like from exhaust gases.

In recent years, environmental considerations have increased the necessity for eliminating particulate matter contained in exhaust gases of combustion apparatuses, such as an internal combustion engine and a boiler. In particular, regulations relating to elimination of particulate matter (PM) including graphite particles or the like discharged from diesel engines tend towards tightening in Europe, the United States, and Japan. A honeycomb structured body referred to as a diesel particulate filter (DPF) has been used to capture and eliminate substances such as PM. A honeycomb structured body is accommodated in a casing that is arranged on an exhaust passage for a combustion apparatus. The honeycomb structured body has a large number of cells that extend in the longitudinal direction of the structure. The cells are partitioned by partitions. In every pair of adjacent cells, one cell has an open end on one side and the other cell has an open end on the opposite side. The opens cells are sealed by a plug. Plugs are arranged in a lattice on each end surface (inlet side end surface and outlet side end surface) of the honeycomb structured body. Exhaust gas enters open cells at the inlet side end surface of the honeycomb structured body, flows through the porous partitions, and is discharged from adjacent open cells at the outlet side end surface. For example, PM discharged from a diesel engine is captured by the partitions that function as a filter, and accumulates on the partitions. The PM accumulating on the partitions is burned and eliminated by a heating means, such as a burner or a heater, or by heat from the exhaust gas.

JP-A 1-258715 describes a conventional honeycomb filter integrally including a honeycomb structured body and plugs for sealing selected opened ends of cells of the honeycomb structured body. The honeycomb structured body is formed of a sintered porous silicon carbide containing aluminum (Al), boron (B), and iron (Fe) content of 1 wt % or less in total and containing free carbon content of 5 wt % or less. The plugs are formed of a sintered porous silicon carbide having a total content of Al, B, and Fe content that is less than the same total of the honeycomb structured body and having a free carbon content of 5 wt % or less. The entire contents of JP-A 1-258715 are incorporated herein by reference.

A honeycomb filter of the present invention includes at least one pillar-shape honeycomb structured body including a plurality of cells partitioned by partitions, and plugs for sealing upstream openings of a plurality of first cells selected from the plurality of cells and for sealing downstream openings of a plurality of second cells selected from the plurality of cells, and is characterized in that each of the plugs is formed of a material having a greater total content of aluminum, iron, boron, silicon, and free carbon than a material forming the honeycomb structured body.

In the honeycomb filter of the present invention, it is preferred that each of the plugs has a first end surface adjacent to an opening of the corresponding one of the cells and a second end surface opposite the first end surface, and that the second end surface is formed so that a length from the first end surface to the second end surface is not constant in a direction perpendicular to a center axis of the cell.

In the honeycomb filter of the present invention, it is preferred that each of the plugs has a first end surface adjacent to an opening of the corresponding one of the cells and a second end surface opposite the first end surface, and the second end surface includes a recess in a central position corresponding to a center axis of the cell.

In the honeycomb filter of the present invention, it is preferred that each of the plugs has an end surface including a recess and comes in contact with the partition outward from the recess at a contact angle of about 1 to about 50 degrees.

In the honeycomb filter of the present invention, it is preferred that the contact angle is about 1 to about 45 degrees.

In the honeycomb filter of the present invention, it is preferred that the contact angle is about 1 to about 30 degrees.

In the honeycomb filter of the present invention, it is preferred that each of the plugs has a first end surface adjacent to an opening of the corresponding one of the cells and a second end surface opposite the first end surface, and that the second end surface includes a projection at a central position corresponding to a center axis of the cell.

In the honeycomb filter of the present invention, it is preferred that each of the plugs has an end surface including a projection and comes in contact with the partition outward from the projection at a contact angle of about 91 to about 179 degrees.

In the honeycomb filter of the present invention, it is preferred that the contact angle is about 91 to about 135 degrees.

In the honeycomb filter of the present invention, it is preferred that each of the plugs have a length varies depending on the distance from the center axis of the corresponding cell in a direction orthogonal to the center axis of the corresponding cell and that the difference between a maximum value and a minimum value of the length of each cell is about fifteen times or less the thickness of the partition.

In the honeycomb filter of the present invention, it is preferred that the difference between a maximum value and a minimum value of the length of each cell is about ten times or less the thickness of the partition.

In the honeycomb filter of the present invention, it is preferred that the honeycomb structured body comprises at least one material selected from the group consisting of cordierite, zirconium phosphate, aluminum titanate, silicon carbide, and a silicon metal-silicon carbide composite.

In the honeycomb filter of the present invention, it is preferred that at least part of the partition carries a catalyst.

In the honeycomb filter of the present invention, it is preferred that the honeycomb structured body is formed by bonding a plurality of honeycomb members with a bonding material, with each honeycomb member having an outer wall, partitions arranged inward from the outer wall, and a plurality of cells partitioned by the partitions and functioning as flow passages for fluid.

In the honeycomb filter of the present invention, it is preferred that a coating layer is applied on an outer circumference of the honeycomb structured body.

In the honeycomb filter of the present invention, it is preferred that the total content of Al, Fe, B, Si, and free carbon in the material for forming the plugs is more than about 0.35 mass %.

In the honeycomb filter of the present invention, it is preferred that the total content of Al, Fe, B, Si, and free carbon in the material for forming the plugs is about 1.5 mass % or less.

In the honeycomb filter of the present invention, it is preferred that the at least one pillar-shape honeycomb structured body is a single monolithic-type honeycomb structure body without a bonding layer.

In the honeycomb filter of the present invention, it is preferred that the monolithic-type honeycomb structure body comprises cordierite, zirconium phosphate, or aluminum titanate.

The present invention proposes a manufacturing method for honeycomb filter including at least one pillar-shape honeycomb structured body including a plurality of cells partitioned by partitions, and plugs for sealing upstream openings of a plurality of first cells selected from the plurality of cells and for sealing downstream openings of a plurality of second cells selected from the plurality of cells. The method is characterized by forming the at least one pillar-shape honeycomb structured body from a material having aluminum, iron, boron, silicon, and free carbon with a desired content, and forming the plugs from a material having a greater total content of aluminum, iron, boron, silicon, and free carbon than the material forming the at least one pillar-shape honeycomb structured body.

In the manufacturing method of the present invention, it is preferred that each of the plugs has a first end surface adjacent to an opening of the corresponding one of the cells and a second end surface opposite the first end surface, and the step of forming the plugs includes forming the second end surface so that a length from the first end surface to the second end surface is not constant in a direction perpendicular to a center axis of the cell.

In the manufacturing method of the present invention, it is preferred that each of the plugs has a first end surface adjacent to an opening of the corresponding one of the cells and a second end surface opposite the first end surface, and the step of forming the plugs includes forming a recess at a central position of the second end surface corresponding to a center axis of the cell.

In the manufacturing method of the present invention, it is preferred that the step of forming the plugs includes forming each of the plugs so that each of the plugs has an end surface including a recess and comes in contact with the partition outward from the recess at a contact angle of about 1 to about 50 degrees.

In the manufacturing method of the present invention, it is preferred that the contact angle is about 1 to about 45 degrees.

In the manufacturing method of the present invention, it is preferred that the contact angle is about 1 to about 30 degrees.

In the manufacturing method of the present invention, it is preferred that the step of forming the plugs includes forming each of the plugs so that each of the plugs has a first end surface adjacent to an opening of the corresponding one of the cells and a second end surface opposite the first end surface, and the second end surface includes a projection at a central position corresponding to a center axis of the cell.

In the manufacturing method of the present invention, it is preferred that the step of forming the plugs includes forming each of the plugs so that each of the plugs has an end surface including a projection and comes in contact with the partition outward from the projection at a contact angle of about 91 to about 179 degrees.

In the manufacturing method of the present invention, it is preferred that the contact angle is about 91 to about 135 degrees.

In the manufacturing method of the present invention, it is preferred that each of the plugs have a length varies depending on the distance from the center axis of the corresponding cell in a direction orthogonal to the center axis of the corresponding cell, and the difference between a maximum value and a minimum value of the length of each cell is about fifteen times or less the thickness of the partition.

In the manufacturing method of the present invention, it is preferred that the difference between a maximum value and a minimum value of the length of each cell is about ten times or less the thickness of the partition.

In the manufacturing method of the present invention, it is preferred that the material forming the honeycomb structured body comprises at least one material selected from the group consisting of cordierite, zirconium phosphate, aluminum titanate, silicon carbide, and a silicon metal-silicon carbide composite.

In the manufacturing method of the present invention, it is preferred to further include providing a catalyst on at least part of the partition.

In the manufacturing method of the present invention, it is preferred that the step of forming the at least one pillar-shape honeycomb structured body includes bonding a plurality of honeycomb members with a bonding material, with each honeycomb member having an outer wall, partitions arranged inward from the outer wall, and a plurality of cells partitioned by the partitions and functioning as flow passages for fluid.

In the manufacturing method of the present invention, it is preferred to further include applying a coating layer on an outer circumference of the honeycomb structured body.

In the manufacturing method of the present invention, it is preferred that the total content of Al, Fe, B, Si, and free carbon in the material for forming the plugs is more than about 0.35 mass %.

In the manufacturing method of the present invention, it is preferred that the total content of Al, Fe, B, Si, and free carbon in the material for forming the plugs is about 1.5 mass % or less.

In the manufacturing method of the present invention, it is preferred that the at least one pillar-shape honeycomb structured body is a single monolithic-type honeycomb structure body without a bonding layer.

In the manufacturing method of the present invention, it is preferred that the monolithic-type honeycomb structure body comprises cordierite, zirconium phosphate, or aluminum titanate.

In the manufacturing method of the present invention, it is preferred that the step of forming the at least one pillar-shape honeycomb structured body includes adding a shortfall of impurities to the material for forming the at least one pillar-shape honeycomb structured body if the content of aluminum, iron, boron, silicon, and free carbon in that material is less than the desired content.

BRIEF DESCRIPTION OF THE DRAWINGS

The invention, together with objects and advantages thereof, may best be understood by reference to the following description of the presently preferred embodiments together with the accompanying drawings in which:

FIG. 6 is a cross-sectional view of the plug of FIG. 5;

FIGS. 7(a) to 7(d) are cross-sectional views of plugs according to further examples of the first embodiment of the present invention;

FIG. 8(a) is a schematic cross-sectional view of a plug forming apparatus, and FIG. 8(b) is a partially enlarged view of the apparatus;

BEST MODE FOR CARRYING OUT THE INVENTION

Figure 1:
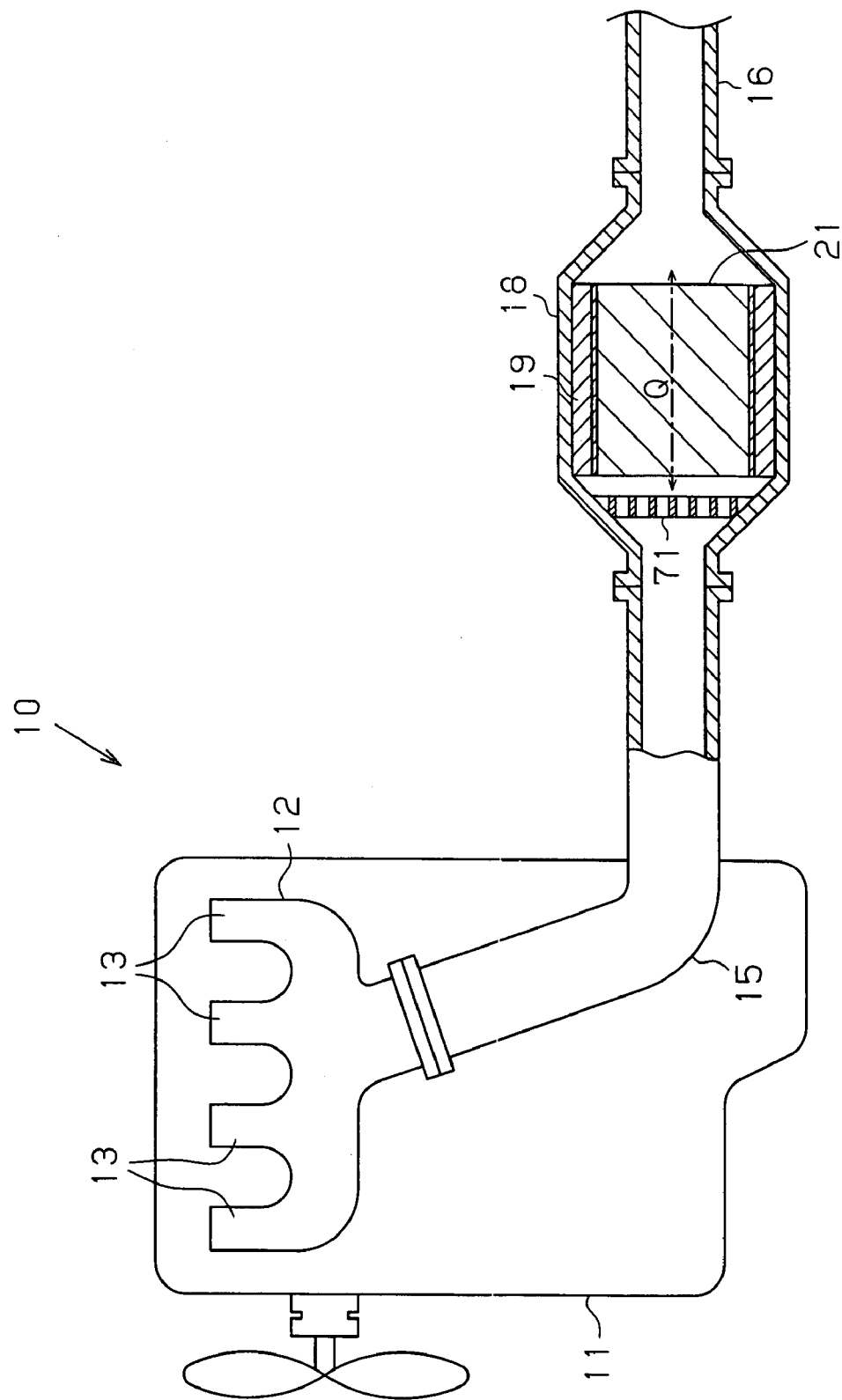
FIG. 1 is a schematic view showing an exhaust gas purification device.

One embodiment according to the present invention proposes a honeycomb filter of the present invention provides at least one pillar-shape honeycomb structured body including at least one plurality of cells partitioned by partitions and plugs for sealing upstream openings of a plurality of first cells selected from the plurality of cells and for sealing downstream openings of a plurality of second cells selected from the plurality of cells. Each of the plugs is formed of a material having a greater total content of aluminum, iron, boron, silicon, and free carbon than a material forming the honeycomb structured body.

Normally, when burning PM, the stress of the thermal impact produced in the filter tends to concentrate at a contact surface, or boundary, between the plug and the partition. Such stress concentration tends to produce cracks in the boundary between the plug and the partition, particularly, in the surface of the plug. Such a crack tends to form a gap between the plug and the partition and to lower the exhaust gas purifying efficiency. Normally, the plug has a thickness that is greater than that of the partition. Thus, the plug tends to have a heat capacitance that is greater than that of the partition. For this reason, if the partition and the plug were to be formed of the same material, the thermal expansion of the plug would be greater than that of the partition. This would result in excessive thermal stress acting in the plug and cause the surface of the plug to crack easily.

Therefore, in one embodiment of the present invention, the material forming the honeycomb structured body includes more impurities (e.g., Al, Fe, B, Si, and free carbon) than the material forming the plug. Such impurity chemical elements are contained between particles forming the honeycomb structured body or the plug and easily liquefy and bond in a firing process. Thus, the impurity chemical elements contained between particles bonds the particles when a filter structured body is fired to obtain the desired honeycomb filter.

Further, the impurity chemical elements easily liquefy between the particles forming the honeycomb structured body and the plug. This may fill fine gaps existing between the particles or gaps newly formed by the thermal stress produced in the plug when the filter structured body is fired. In other words, the impurities such as the Al, B, Fe, and free carbon, which are contained in the sintered porous silicon carbide forming the honeycomb structured body and the plugs, remain after the honeycomb structured body is fired. Such impurities promote growth of silicon carbide particles when the honeycomb structured body is fired. The above chemical elements adhere to the surfaces of particles forming the honeycomb structured body, or melt in the process of firing the honeycomb structured body and fill gaps between the particles. In this way, the impurities function to increase the heat resistance and the strength of the honeycomb structured body. When the honeycomb structured body and the plugs are formed of materials having different compositions, the honeycomb structured body and the plugs may have thermal expansion coefficients differing from one another. In this case, thermal shock stress generated when PM is burned tends to concentrate on the boundary between the honeycomb structured body and the plugs. In this case, the plugs are more likely to crack than the honeycomb structured body. This is because the plugs have a smaller total content of impurities (Al, B, Fe, and free carbon), which function to increase the heat resistance and the strength of the honeycomb structured body, than the honeycomb structured body. In addition, the plugs may have excessive thermal expansion during PM burning performed with the heat of exhaust gas. The plugs may also crack because of their excessive thermal expansion. If the plugs crack, exhaust gas yet to be purified sufficiently may leak from the cracks formed in the plugs. As a result, the filter function may become poor, that is, the exhaust gas purification efficiency of the honeycomb filter may decrease. As described above, in one embodiment of the present invention, more impurity chemical elements are included in the material forming the plug than the honeycomb filter. Thus, the impurity chemical elements will be sufficiently effective in the plug than in the honeycomb structured body. Accordingly, in one embodiment of the present invention, since particles forming the plug are firmly bonded together by the liquefied impurities, the heat resistance and strength of the plug is sufficiently improved. Thus, even if stress resulting from the thermal impact produced when burning PM concentrates at the boundary between the plug and the partition or even if the plug thermally expands excessively, cracks may easily be prevented from being produced in the plug, especially along the boundary portions.

It is preferred that each of the plugs has a first end surface adjacent to an opening of the corresponding one of the cells and a second end surface opposite the first end surface, and that the second end surface is formed so that a length from the first end surface to the second end surface is not constant in a direction perpendicular to a center axis of the cell. With this structure, in comparison with a plug of which the length between the first end surface and second end surface of a cell is constant, that is, in comparison with a plug including flat first and second end surfaces, the plug that is obtained easily reduces thermal expansion caused by the stress resulting from thermal impact or the burning of PM. Accordingly, cracking in the plug will be easily be effectively suppressed.

It is preferred that each of the plugs has a first end surface adjacent to an opening of the corresponding one of the cells and a second end surface opposite the first end surface, and that the second end surface includes a recess in a central position corresponding to a center axis of the cell. With this structure, the stress produced when a thermal impact occurs in the honeycomb filter during the PM burning may be easily be concentrated at the center of the recess located in the second end surface of the plug. This makes it easy to reduce the concentration of stress applied to the boundary between the plug and the partition. If a crack were to be produced by stress concentration near the boundary between the plug and the partition, the crack would grow significantly and hamper the functions of the plug. However, with the above structure, stress is easily concentrated at the central portion of the plug. This makes it difficult to generate cracks. Even if cracking occurs, there is a resistance to growth of the cracking. Thus, the functions of the plug may be easily maintained over a long period.

It is preferred that each of the plugs comes in contact with the partition outward from the recess at a contact angle of about 1 to about 50 degrees. This structure makes it easy to reduce stress produced at the boundary between the plug and the partition, while concentrating the stress at the central portion of the plug in a preferable manner. Thus, the functions of the plug may be easily maintained in an optimized manner.

It is preferred that each of the plugs has a first end surface adjacent to an opening of the corresponding one of the cells and a second end surface opposite the first end surface, and that the second end surface includes a projection at a central position corresponding to a center axis of the cell. With this structure, the stress produced when a thermal impact occurs in the honeycomb filter during the PM burning easily concentrates at the center of the projection located in the second end surface of the plug. This makes it easy to reduce the concentration of stress applied to the boundary between the plug and the partition. If a crack were to be produced by stress concentration near the boundary between the plug and the partition, the crack would grow significantly and hamper the functions of the plug. However, with the above structure, stress is easily concentrated at the central portion of the plug. This makes it difficult to generate cracks. Even if cracking occurs, there is a resistance to growth of the cracking. Thus, the functions of the plug may be easily maintained over a long period.

It is preferred that each of the plugs comes in contact with the partition outward from the projection at a contact angle of about 91 to about 179 degrees. This structure makes it easy to reduce stress produced at the boundary between the plug and the partition, while concentrating the stress at the central portion of the plug in a preferable manner. Thus, the functions of the plug may easily be maintained in an optimized manner.

It is preferred that a length from the first end surface to the second end surface of each plug varies depending on the distance from the center axis of the corresponding cell, and that the difference between a maximum value and a minimum value of the length from the first end surface to the second end surface is about fifteen times or less the thickness of the partition, and more preferably about ten times or less the thickness of the partition. With this structure, the second end surface of the plug may be likely excluded from a defective range. Thus, it is easy to prevent concentration of excessive stress on the surface portion of the plug, and stress will be appropriately mitigated. Accordingly, it will easily be prevented to form cracks in the surface portion of the plug.

It is preferred that the honeycomb structured body comprises at least one material selected from the group consisting of cordierite, zirconium phosphate, aluminum titanate, silicon carbide, and a silicon metal-silicon carbide composite. Cordierite, zirconium phosphate, aluminum titanate, silicon carbide, and a silicon metal-silicon carbide composite have a relatively low thermal expansion coefficient. Thus, by using one material selected from the group or a composite material of two or more materials selected from the group, a honeycomb filter having superior thermal impact resistance can be obtained. Further, among these materials, when using at least one of zirconium phosphate, aluminum titanate, and silicon carbide to form the honeycomb structured body, the melting point increases. This makes it possible to obtain a honeycomb filter having superior heat resistance.

It is preferred that at least part of the partition carries a catalyst. With this structure, the catalyst easily burns up the PM captured in an on the partition.

It is preferred that the honeycomb structured body is formed by bonding a plurality of honeycomb members with a bonding material, with each honeycomb member having an outer wall, partitions arranged inward from the outer wall, and a plurality of cells partitioned by the partitions and functioning as flow passages for fluid. With this structure, the honeycomb members are bonded each other to form the honeycomb structured body. In comparison with a honeycomb structured body including one honeycomb member, this, for example, reduces the thermal impact produced between the members when PM is burned in the filter. Accordingly, it will be easy to suppress crack formation in the honeycomb structured body as much as possible.

It is preferred that a coating layer be applied on an outer circumference of the honeycomb structured body. With this structure, it will be easy to suppress displacement of the honeycomb filter.

A honeycomb filter according to a preferred embodiment of the present invention will now be described. The honeycomb filter is applied to an exhaust gas purification device for a vehicle. The exhaust gas purification device is of a spontaneous ignition form in which the captured PM is eliminated with only the heat from exhaust gas. The honeycomb filter according to the preferred embodiment may also be applied to other types of exhaust gas purification devices.

As shown in FIG. 1, an exhaust gas purification device 10 purifies, for example, exhaust gas discharged from a diesel engine 11. The diesel engine 11 includes a plurality of cylinders (not shown). A plurality of branch pipes 13 for an exhaust manifold 12, which is formed of a metal material, are connected to the cylinders.

A first exhaust pipe 15 and a second exhaust pipe 16, which are formed of a metal material, are arranged at positions downstream from the exhaust manifold 12. An upstream end of the first exhaust pipe 15 is connected to the manifold 12. A tubular casing 18, which is formed of a metal material, is arranged between the first exhaust pipe 15 and the second exhaust pipe 16. An upstream end of the casing 18 is connected to a downstream end of the first exhaust pipe 15. A downstream end of the casing 18 is connected to an upstream end of the second exhaust pipe 16. The interiors of the first exhaust pipe 15, the casing 18, and the second exhaust pipe 16 communicate with one another. Exhaust gas flows through the interior of the first exhaust pipe 15, the casing 18, and the second exhaust pipe 16.

A central portion of the casing 18 has a larger diameter than the exhaust pipes 15 and 16. The casing 18 has a larger inner area than that of the exhaust pipes 15 and 16. A honeycomb filter 21 is accommodated in the casing 18. A heat insulator 19, separate from the honeycomb filter 21, is arranged between the outer circumferential surface of the honeycomb filter 21 and the inner circumferential surface of the casing 18. A catalytic converter 71 is accommodated in the casing 18 at a position upstream from the honeycomb filter 21. The catalytic converter 71 carries an oxidation catalyst, which is known in the art. Exhaust gas is oxidized in the catalytic converter 71. Oxidation heat generated during the oxidation is transmitted to the honeycomb filter 21 to burn and eliminate PM in the honeycomb filter 21. In the present specification, the burning and elimination of PM is referred to as "PM elimination" or "honeycomb filter regeneration".

The honeycomb filter 21 according to the first embodiment will now be described.

Figure 2:
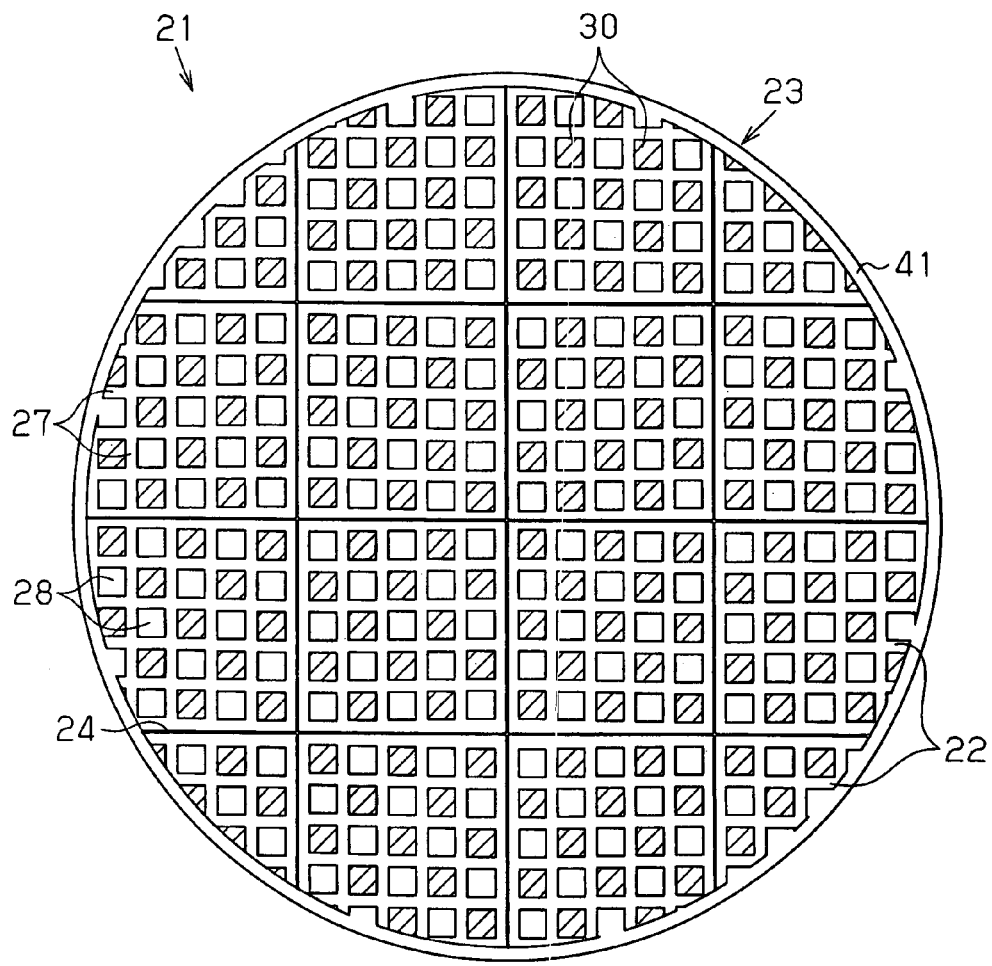
FIG. 2 is a plan view showing one end of a honeycomb filter according to one example of a first embodiment of the present invention.

The honeycomb filter 21 shown in FIG. 2 includes a honeycomb structured body 23 formed by a plurality of (sixteen in the present embodiment) honeycomb members 22 having pillar shapes. Each honeycomb member 22 has a plurality of cells 28, some of which are sealed by plugs 30. Each honeycomb member 22 may have a polygonal pillar shape, such as a square pillar shape.

The manufacture of the honeycomb filter 21 will now be described. First, unfired honeycomb structured bodies, or honeycomb extruded bodies having the same shapes as the honeycomb members 22 are formed by extrusion. The honeycomb extruded bodies are combined into an aggregation using a bonding material 24. A plug paste, which will be described later, is filled at predetermined positions of the aggregation to form a filter body. The filter body is fired under a predetermined condition. The fired filter body is cut to have a circular cross-section. This completes the manufacture of the honeycomb filter 21. In the example shown in FIG. 2, some partitions 27 are partially missing and some cells 28 are exposed from the filter circumferential surface as a result of cutting the filter circumferential surface. The exposed cells 28 are filled with a coating paste (a material for a coating layer 41) when the coating layer 41 is applied. In the present specification, the term "cross-section" refers to a cross-section that is orthogonal to an axis Q of the honeycomb filter 21 (refer to FIG. 1). The bonding material 24 may contain an inorganic binder, an organic binder, and inorganic fibers.

Figure 3:
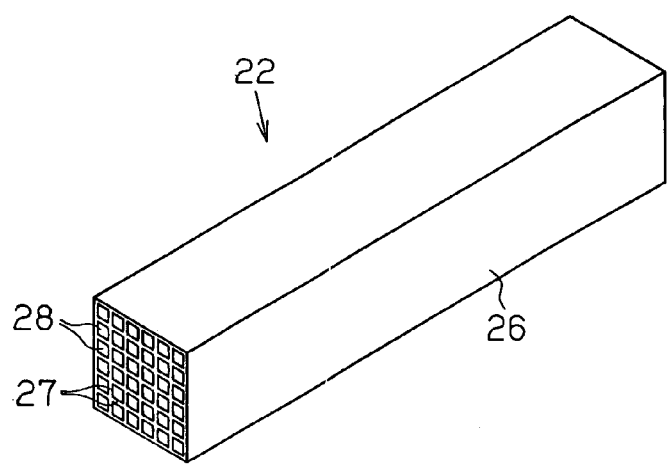
FIG. 3 is a perspective view showing a honeycomb member used in the honeycomb filter of FIG. 2.

As shown in FIG. 3, each honeycomb member 22 includes an outer wall 26 and partitions 27 arranged inward from the outer wall 26. The honeycomb member 22 has a square cross-section. A material for the outer wall 26 and the partitions 27 of the honeycomb member 22, that is, the main material (main component) for the honeycomb structured body 23, may be, for example, porous ceramic. The "main component" refers to a component constituting about 50 wt % or more of all the components forming the honeycomb structured body 23.

Examples of such porous ceramic include ceramic having a relatively low thermal expansion coefficient, such as cordierite, zirconium phosphate, aluminum titanate, silicon carbide, and a silicon metal-silicon carbide composite. These different kinds of porous ceramic may be used solely or two or more of these kinds may be used in combination. Among these kinds, it is preferable to use one of silicon carbide, a silicon metal-silicon carbide composite, zirconium phosphate, and aluminum titanate, which have a high heat resistance and a high melting point.

The material for the honeycomb structured body 23 contains impurities comprised of the Al, Fe, B, Si, and free carbon. The material for the honeycomb structured body 23 typically contains about 0.3 mass % of such impurities in total. The Al, Fe, B, Si, and free carbon easily liquefy in the process of firing the filter body and adhere to the surfaces of particles of the main component of the honeycomb structured body 23 (e.g. silicon carbide particles) or fill gaps between the particles. In this way, these impurities have a function to improve the heat resistance and the strength of the honeycomb structured body 23.

The partitions 27 in the present embodiment may carry an oxidation catalyst comprised of, for example, a platinum group element (e.g. Pt) or another metal element and their oxide. When the partitions 27 carry such an oxidation catalyst, the catalytic action of the oxidation catalyst accelerates the burning of the PM captured on and in the partitions 27.

Figure 4:
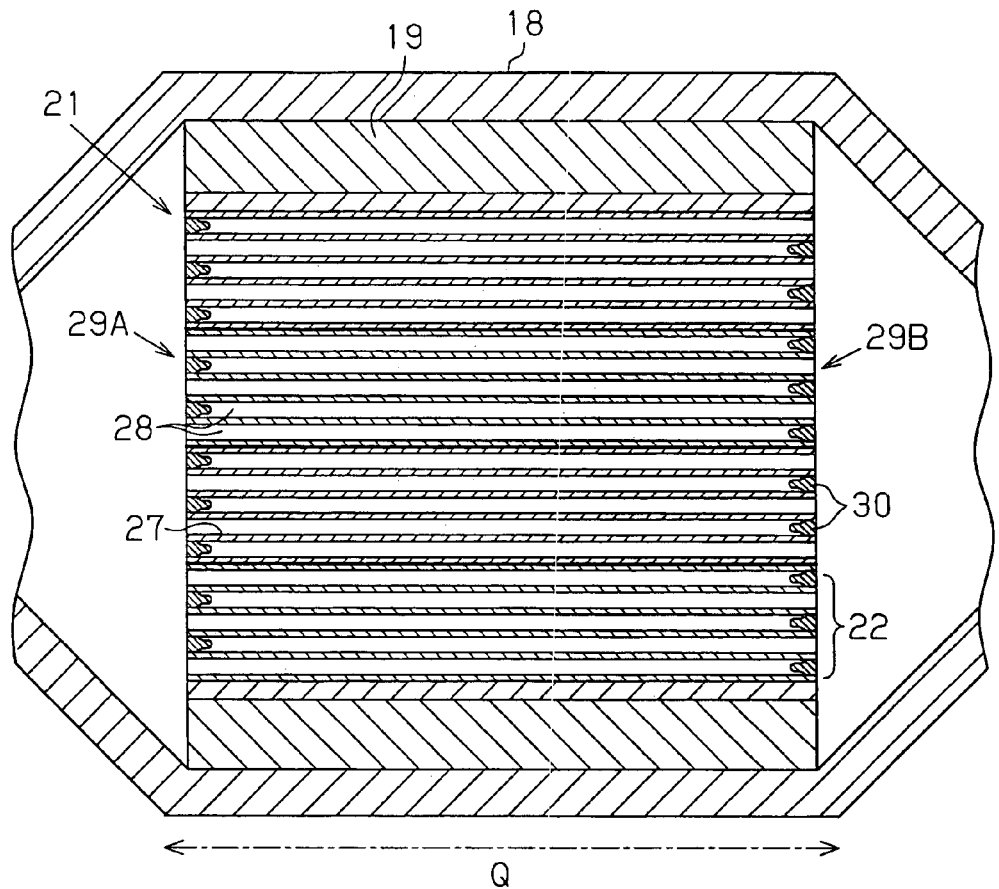
FIG. 4 is a cross-sectional view of a honeycomb filter according to one example of the first embodiment of the present invention.

The honeycomb member 22 has the plurality of cells 28 that are partitioned by the partitions 27. As shown in FIG. 4, each cell 28 extends from one end surface (upstream end surface 29A) to another end surface (downstream end surface 29B) along the axis Q and functions as a flow passage for exhaust gas, which serves as a fluid. Each cell 28 has an opening at the end surface 29A and an opening at the end surface 29B. One of the openings of each cell 28 is sealed by a plug 30. A plurality of plugs 30 are arranged in a lattice on each of the end surfaces 29A and 29B. More specifically, about half of the cells 28 open at the upstream end surface 29A, and about half of the remaining cells 28 open at the downstream end surface 29B.

It is preferable that the main material (main component) for the plugs 30 be the same porous ceramic as the material used for the honeycomb structured body 23 (cordierite, zirconium phosphate, aluminum titanate, silicon carbide, and a silicon metal-silicon carbide composite) so that the plugs 30 have the same properties (e.g. thermal expansion coefficient) as the honeycomb structured body 23. The term "main component" refers to a component constituting about 50 mass % or more of the components forming the plugs 30.

The material for the plugs 30 contains impurities comprised of the Al, Fe, B, Si, and free carbon in the same manner as the material for the honeycomb structured body 23. The material for the plugs 30 in the present embodiment has a greater content of such impurities than the material for the honeycomb structured body 23. More specifically, the total content of such impurities in the material for the plugs 30 is more than about 0.35 mass %, and preferably about 1.5 mass % or less.

When the total content of such impurities exceeds about 0.35 mass %, the heat resistance and the strength of the plugs 30 may be sufficiently high. More specifically, stress generated at the boundary between the plugs 30 and the partitions 27 or excessive thermal expansion of the plugs 30 during PM burning performed with the heat of exhaust gas may hardly cause the plugs 30 to crack. When the total content of such impurities is about 1.5 mass % or less, the plugs 30 may hardly to form cracks even if each plug 30 have varying degrees of thermal expansion. Further, that amount of the impurities, which may function as a sintering aid, may lower the possibility of excessive acceleration of sintering of the plugs 30 and prevent the strength of the plugs 30 from decreasing.

Figure 5:
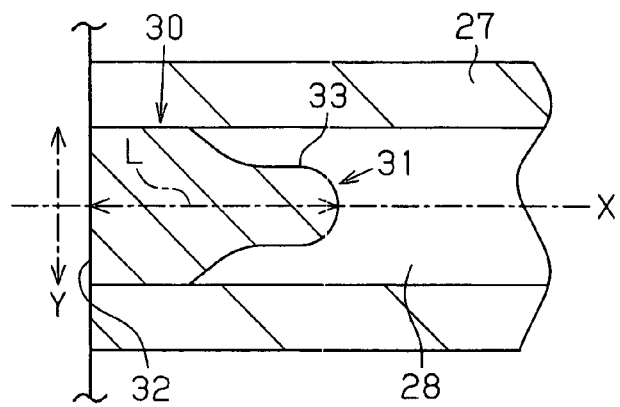
FIG. 5 is a partially enlarged cross-sectional view of a plug of the honeycomb filter of FIG. 4.

As shown in FIG. 5, each plug 30 has an inner surface 33 with a projection 31. The projection 31 of each plug 30 is formed at a central position, which corresponds to a center axis X of the associated cell 28. The projection 31 enables thermal expansion of the plug 30 to concentrate on the central position and thereby reduces thermal expansion occurring at outward locations of the projection 31 in the plug 30. The projection 31 is formed at a central portion of the plug 30 corresponding to the center axis X of the cell 28 and projects toward the open side of the associated cell 28 that is opposite to the side the plug 30 is arranged. The plug 30 includes a flat first end surface 32 located at an outer side of the cell 28 and a second end surface 33 located at an inner side of the cell 28. Length L from the first end surface 32 to the second end surface 33 is not constant in direction Y, which is perpendicular to the center axis X of the cell 28, and varies continuously from the periphery of the plug 30 toward the center of the plug 30. In detail, the plug 30 is formed in a manner that the length L increases gradually from its periphery to its central portion.

As shown in FIG. 6, a contact angle θ formed at the peripheral side of the projection 31 between the outer surface of the projection 31 and the partition 27 is in a range of about 91 to about 179 degrees, and more preferably in a range of about 91 to about 135 degrees. When the contact angle θ is less than about 91 degrees, the peripheral side of the plug 30 would act as a notch K as shown in FIG. 7(d). In this case, when the thermal stress described above is generated, stress would tend to concentrate excessively on the boundary between the partition 27 and the plug 30. As a result, the surface boundary at the peripheral side of the plug 30 easily cracks or falls off. When the contact angle θ exceeds about 179 degrees, the projection 31 hardly exists and may cause the plug 30 to crack easily at its peripheral side. The contact angle θ in the range of about 91 to about 179 degrees makes it easy to prevent crack formation and falling of the plugs 30.

The difference between the maximum value L1 and the minimum value L2 of the length L from the first end surface 32 to the second end surface 33 is about fifteen times or less the thickness T of the partition 27, and more preferably, about ten times or less of the thickness T. When the difference exceeds about fifteen times the thickness T, the second end surface 33 of the plug 30 is considered to be defective. As a result, when the thermal shock described above is generated in the honeycomb filter 21, stress easily concentrates on the boundary between the projection 31 and the partition 27. Thus, the plug 30 cracks easily at positions more outward from the projection 31. When the difference is about fifteen times or less, crack formation and falling of the plugs 30 will be easily suppressed.

As shown in FIG. 2, the coating layer 41 is applied on the entire outer surface of the honeycomb structured body 23. The coating layer 41 prevents the honeycomb filter 21 from being displaced in the casing 18. The coating layer 41 contains inorganic particles, inorganic fibers, an inorganic binder, and an organic binder. Examples of the inorganic particles contained in the coating layer 41 include ceramics selected from a group of silicon carbide, silicon nitride, cordierite, alumina, mullite, zirconia, zirconium phosphate, aluminum titanate, titania, and a combination thereof; an iron-chrome-aluminum metal; a nickel metal; and a silicon metal-silicon carbide composite. Examples of the inorganic fibers include silica-alumina ceramic fibers, mullite fibers, silica fibers, alumina fibers, and zirconia fibers. Examples of the inorganic binder include an alumina sol, a silica sol, and a titania sol. Examples of the organic binder include hydrophilic organic polymers, such as carboxymethyl cellulose, polyvinyl alcohol, methyl cellulose, and ethyl cellulose.

A method for manufacturing the honeycomb filter 21 of the first embodiment will now be described. A method for manufacturing a honeycomb extruded body having the same shape as the honeycomb member 22 will first be described. The honeycomb extruded body is formed by extruding a material paste containing porous ceramic particles (e.g. alpha silicon carbide particles and beta silicon carbide particles); an auxiliary agent such as aluminum, boron, iron, and carbon; an organic binder (e.g., methylcellulose); and water. When the porous ceramic particles have a desired content of the impurities (Al, Fe, B, Si, and free carbon), the above auxiliary agent does not have to be added. When the porous ceramic particles have an impurity content less than the desired content, a shortfall of the impurities may be added if needed. The "material paste" refers to the "material for the honeycomb structured body 23" in this specification. The honeycomb extruded bodies formed with this method are bonded together by a bonding material paste to form an aggregation S.

Next, the plugs 30 are arranged in open ends of predetermined cells 28 in the aggregation S. In the present embodiment, a plug forming apparatus or sealing apparatus 51 shown in FIG. 8 is used. First, a plug paste P containing porous ceramic particles (e.g. alpha silicon carbide particles and beta silicon carbide particles), an auxiliary agent such as aluminum, boron, iron, and carbon, a lubricant agent (e.g. polyoxyethylene mono butyl ether), a solvent (e.g. diethylene glycol mono-2-ethylhexyl ether), a dispersing agent (e.g. phosphate ester compound), and a binder (e.g. n-butyl methacrylate dissolved in OX-20) is filled in two ejection tanks 52 of the sealing apparatus 51. The aggregation S is then arranged between the ejection tanks 52. The plug paste contains a greater amount of the auxiliary agent, such as aluminum, boron, iron, and carbon, than the material paste for the honeycomb member 22. When the porous ceramic particles have a desired content of the impurities (Al, Fe, B, Si, and free carbon), the above auxiliary agent does not have to be added. When the porous ceramic particles have an impurity content less than the desired content, a shortfall of the impurities may be added if needed. The "plug paste" refers to the "material for the plugs 30" in this specification.

Masks 53, which are arranged in a lattice on the inner walls of the ejection tanks 52, come in contact with open ends of predetermined cells 28A in a manner that openings 54 of the masks 53 face open ends of the cells other than the predetermined cells 28A, or the remaining cells 28B. The remaining cells 28B and the interiors of the ejection tanks 52 are in communication with each other. In this state, a mono pump (not shown) is used to apply a predetermined pressure inside the ejection tanks 52 to eject the plug paste P through the openings 54 of the masks 53 and fill the plug paste P in the open ends of the cells 28B. The shape of the plugs 30 (projections 31) may be changed appropriately by adjusting the viscosity of the plug paste P.

Next, the aggregation S, in which the plug paste is filled at predetermined positions of the filter body, is dried, degreased, fired under a predetermined condition, and then cut to have a circular cross-section. This completes the manufacture of a desired honeycomb filter 21.

The plugs may be arranged in the aggregation S after cutting the aggregation S to have a predetermined cross-section.

In the aforementioned method of the honeycomb filter 21, the plugs are arranged after completion in the aggregation S. Filling of the plug paste may be performed before completion of the aggregation S. For example, the plug paste may be filled in predetermined cell openings of undried honeycomb extruded body, and then the honeycomb extruded body may be dried, degreased, and fired to form the honeycomb structured body 23. Thereafter, a plurality of honeycomb structured bodies 23 may be bonded together by a bonding material paste to form an aggregation S, and the aggregation S may be cut into a predetermined shape to form the honeycomb filter 21.

When the filter body is fired, the impurities contained in the filter body (Al, Fe, B, Si, and free carbon) easily liquefy between the particles of the main component of the filter body (e.g. silicon carbide particles) and bond the particles together. Further, the liquefied impurities may fill fine gaps formed between the particles or may fill new gaps formed when thermal stress is generated in the filter body in the process of firing the filter body. This easily enables the honeycomb filter 21 to have a high heat resistance and a high strength.

The material for the plugs 30 has a greater total content of the impurities than the material for the honeycomb structured body 23 (partitions 27). Thus, the plugs 30 are more likely to have a high heat resistance and a high strength than the honeycomb structured body 23 (partitions 27). When the exhaust gas is purified using the honeycomb filter 21 of the present embodiment, stress generated by thermal shock during PM burning may concentrate on the boundary between the plugs 30 and the partitions 27 or the plugs 30 may have excessive thermal expansion. Even in this case, it is easy to prevent as much as possible crack formation of the plugs 30 particularly along the boundary between the plugs 30 and the partitions 27.

When the plugs 30 have excessive thermal expansion, such thermal expansion mainly concentrates on the projections 31. This makes it easy to reduce thermal expansion of the plugs 30 occurring around the boundary between the plugs 30 and the partitions 27. As a result, cracking or separation of the plugs 30 at the outer side of the boundary portions is optimally and easily prevented. This makes it easy to prevent gaps from being formed at the boundary between the plugs 30 and the partitions 27, to prevent the exhaust gas that has not yet been sufficiently purified from being discharged, and to prevent the exhaust gas purification efficiency from decreasing. It is possible to maintain the sealing performance of the plugs 30 over a long period of time.

The first embodiment has the advantages described below.

(1) The material for the plugs 30 has a greater content of the impurities than the material for the honeycomb structured body 23. Thus, the impurities in the plugs 30 are more effective than the impurities in the honeycomb structured body 23. This makes it easy to enable the particles forming the plugs 30 to be bonded together strongly by the liquefied impurities. As a result, the plugs 30 have a sufficiently high heat resistance and a sufficiently high strength. It is easy to prevent the plugs 30 from cracking even when stress generated by thermal shock during PM burning concentrates on the boundary between the plugs 30 and the partitions 27 or when the plugs 30 have excessive thermal expansion.

(2) The plug 30 has the projection 31 at its central position. When the plug 30 undergoes excessive thermal expansion, such thermal expansion tends to concentrate mainly on the projection 31. This makes it easy to reduce thermal expansion occurring at the outer side of the plug 30. As a result, cracking or separation of the plug 30 is easily prevented along its boundary portion at the circumferential side.

(3) The contact angle θ formed by the outer surface of the projection 31 at the outer side and the partition 27 is about 91 to about 179 degrees. This reduces thermal expansion occurring near the boundary between the plug 30 and the partition 27, and enables such thermal expansion to concentrate on the central position of the plug 30. In this case, the plug 30 has thermal expansion concentrating on its central position at which cracks are less likely to be generated or less likely to grow as compared with its outer side. As a result, the plugs 30 are prevented from cracking, and the plugs 30 maintain their sealing performance in an optimum manner.

(4) The difference between the maximum value L1 and the minimum value L2 of the length L from the first end surface 32 to the second end surface 33 of the plug 30 is about fifteen times or less the thickness T of the partition 27, and more preferably, about ten times or less of the thickness T. Thus, stress generated by thermal shock in the honeycomb filter 21 is easily prevented from concentrating on the boundary of the projection 31 and the partition 27, and the projection 31 of the plug 30 is easily prevented from cracking.

(5) The honeycomb structured body 23 comprises at least one material selected from the group consisting of cordierite, zirconium phosphate, aluminum titanate, silicon carbide, and a silicon metal-silicon carbide composite. In other words, the honeycomb structured body 23 is formed of porous ceramic having a low thermal expansion coefficient. This makes it easy to enable the honeycomb filter 21 to have high resistance to thermal shock.

(6) It is preferable that the partitions 27 carry an oxidation catalyst. The catalytic action of the oxidation catalyst easily burns and eliminates the PM captured on and in the partitions 27.

(7) The honeycomb structured body 23 is formed by bonding the honeycomb members 22 using the bonding material 24. The honeycomb structured body 23 has less thermal shock generated during PM burning between the honeycomb members 22 than a honeycomb structured body formed by a single honeycomb member 22. As a result, it is easy to effectively prevent the honeycomb structured body 23 from cracking.

(8) The coating layer 41 is applied on the outer circumference of the honeycomb structured body 23. This makes it easy to prevent displacement of the honeycomb filter 21 in the casing 18.

A honeycomb filter 21 according to a second embodiment of the present invention will now be described. The honeycomb filter 21 of the second embodiment differs from the honeycomb filter of the first embodiment only in the shape of its plugs 30. The difference will now be described.

Figure 9:
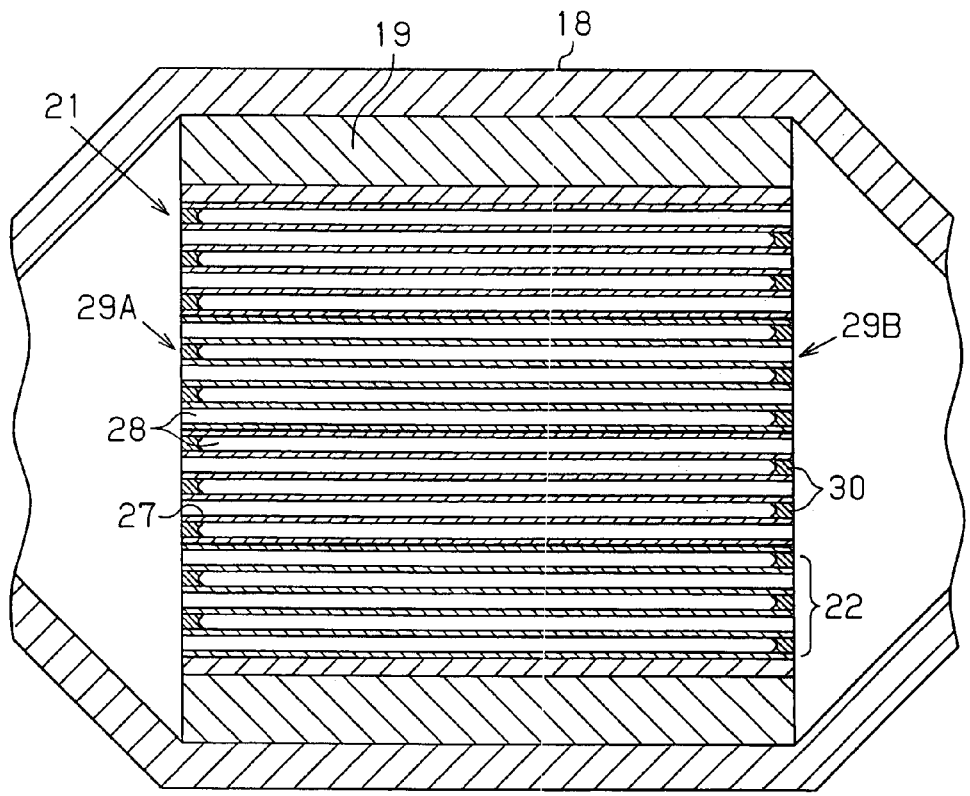
FIG. 9 is a cross-sectional view of a honeycomb filter according to one example of a second embodiment of the present invention.
Figure 10:
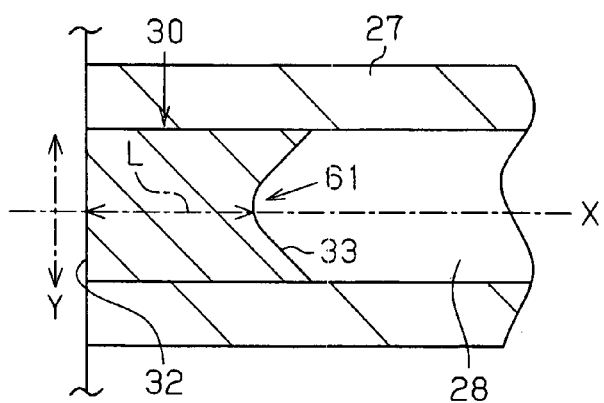
FIG. 10 is a partially enlarged cross-sectional view of a plug of the honeycomb filter of FIG. 9.

As shown in FIGS. 9 and 10, each plug 30 of the second embodiment has a recess 61 on its inner surface 33. The recess 61 of each plug 30 is formed in the central position of the corresponding cell 28 along the center axis X. The recess 61 enables stress generated by the thermal shock described above to concentrate at the central position. This reduces stress concentrating at positions outward from the recess 61. The plug 30 includes a first end surface 32, which is flat and adjacent to an opening of the cell 28, and a second end surface 33, which is opposite the first end surface 32. A length L from the first end surface 32 to the second end surface 33 is not constant in direction Y, which is perpendicular to the center axis X of the cell 28, and changes continuously from the outer side of the plug 30 toward the central position of the plug 30. In detail, the plug 30 is formed in a manner that the length L decreases gradually from its outer side to its central position.

Figure 11:
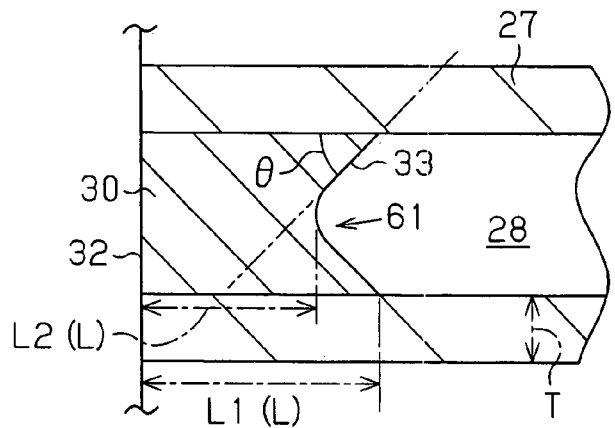
FIG. 11 is a cross-sectional view of the plug of FIG. 10.

As shown in FIG. 11, a contact angle θ formed by the partition 27 and the inner surface of the recess 61 at the outer is about 1 to about 50 degrees, preferably about 1 to about 45 degrees, and most preferably about 1 to about 30 degrees. When the contact angle θ is less than about 1 degree, the contact length of the plug 30 and the partition 27 becomes substantially long. In this case, the surface area of the partition 27 may decrease and the PM capturing efficiency may decrease. Further, the thickness of the outer side of the plug 30 may decrease. This may result in a tendency of separation of the outer portion of the plug 30. When the contact angle θ exceeds about 50 degrees, the recess 61 has little effect. In this case, stress generated by the thermal shock described above in the honeycomb filter 21 concentrates excessively on the boundary between the partition 27 and the plug 30. The plug 30 may crack easily along the boundary at the outer side The contact angle θ in the range of about 1 to about 50 degrees improves PM capturing efficiency and makes it easy to prevent crack formation.

The difference between a maximum value L1 and a minimum value L2 of the length L from the first end surface 32 to the second end surface 33 about fifteen times or less the thickness T of the partition 27, or more preferably about ten times or less the thickness T. When the difference exceeds about fifteen times the thickness T, the second end surface 33 of the plug 30 is considered to be defective. In this case, an excessively large amount of PM may accumulate in the recess 61 in the process of purifying the exhaust gas. Such unburned residual PM may cause the PM to self-ignite locally. Thermal shock generated by such self-ignition of the PM may cause a large crack in the plug 30 at its central position. When the difference is about fifteen times or less, crack formation will be easily suppressed.

The method for manufacturing the honeycomb filter 21 of the second embodiment will now be described focusing on differences from the manufacturing method according to the first embodiment.

Figure 13:
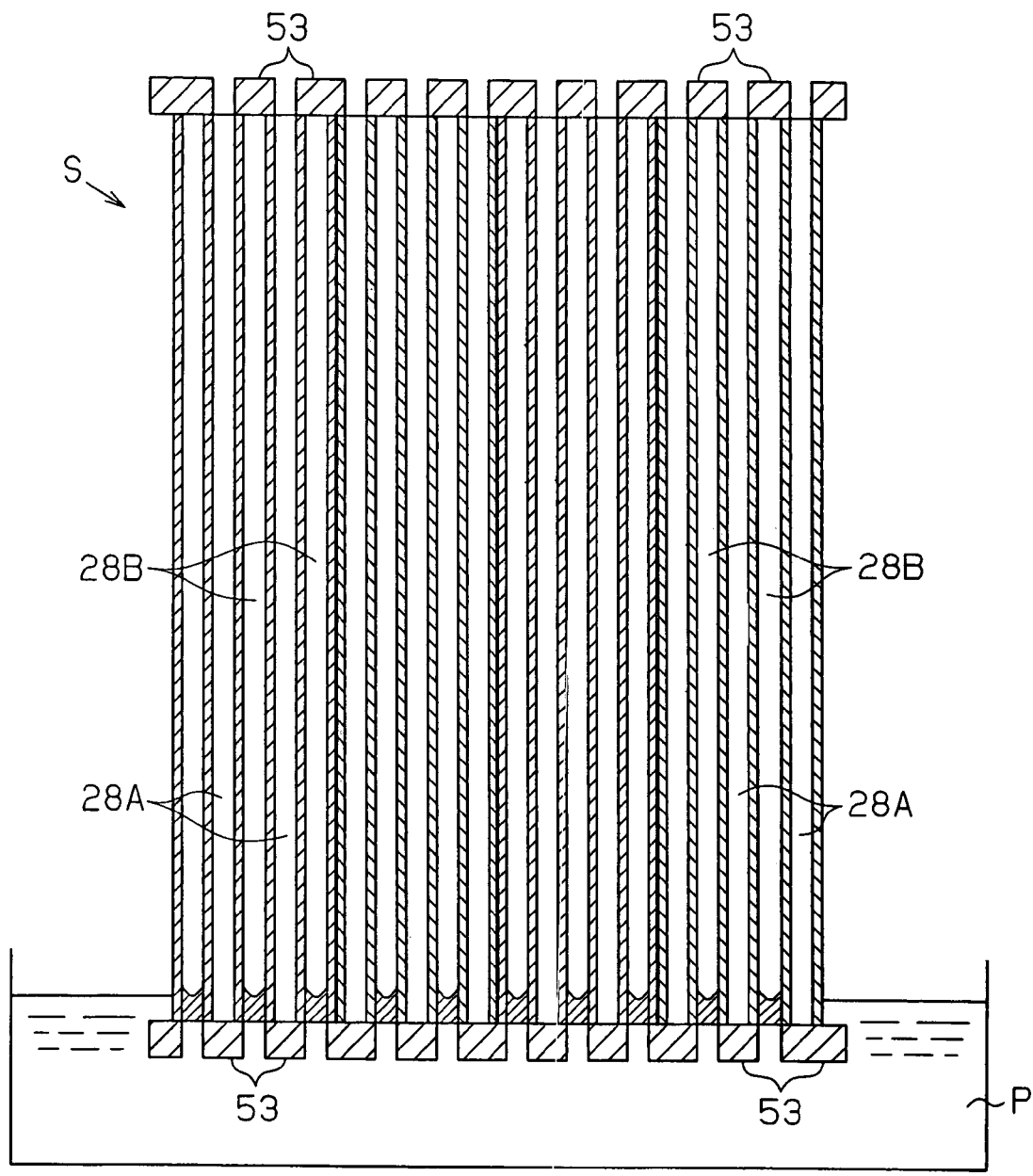
FIG. 13 is a diagram showing the formation of the plug of FIG. 10.

As shown in FIG. 13, in an aggregation S formed by bonding a plurality of honeycomb extruded bodies, resin masks 53 close open ends of predetermined cells 28A at one side (upstream side) of the aggregation S and open ends of the remaining cells 28B at the other side (downstream side) of the aggregation. The one side of the aggregation S is then immersed in a plug paste P. As a result, the plug paste P enters the cells 28B and closes the openings of the cells 28B. The shape of the plugs 30 (recesses 61) may be changed appropriately by adjusting the viscosity of the plug paste P. Next, the other side of the aggregation S is immersed in the plug paste P in the same manner as described above. The aggregation S, in which the plug paste P is filled to predetermined positions of the filter body, is dried, degreased, fired under a predetermined condition, and then cut to have a circular cross-section. This completes the manufacture of a desired honeycomb filter 21.

When the exhaust gas is purified using the honeycomb filter 21 of the second embodiment, stress generated by thermal shock in the honeycomb filter 21 tends to concentrate on the recesses 61 (central positions) of the plugs 30. This makes it easy to reduce stress generated at the outer side of the plugs 30 and to prevent cracking or separation of the plugs 30 along their boundary portions at the outer side. This makes it easy to prevent gaps from being formed at the boundary between the plugs 30 and the partitions 27, to prevent the exhaust gas that has not yet been sufficiently purified from being discharged, and to prevent the exhaust gas purification efficiency from decreasing. The plugs 30 can maintain their sealing performance over a long period of time.

Further, the contact angle θ formed by the inner surface of the recess 61 at the outer side and the partition 27 is about 1 to about 50 degrees. This reduces stress generated at the boundary between the plug 30 and the partition 27 and enables such stress to concentrate on the central position of the plug 30. In this case, the plug 30 has stress concentrating on its central position at which cracks are less likely to be generated or less likely to grow as compared with its outer side. As a result, the plugs 30 are prevented from cracking, and the plugs 30 maintain their sealing performance in an optimum manner.

The above embodiments may be modified in the following forms.

The honeycomb filter 21 is not limited to an aggregation-type honeycomb structure body comprising a plurality of honeycomb structure bodies 23 bonded together by a bonding material paste. The honeycomb filter 21 may be a monolithic-type honeycomb structure body comprising a single honeycomb structured body 23 without using a bonding material paste or without a bonding layer. For the aggregation-type honeycomb structure body, it is preferable that each of the plurality of honeycomb structure bodies 23 comprises silicon carbide or a silicon metal-silicon carbide composite. For the monolithic-type honeycomb structure body, it is preferable that the honeycomb structure body 23 comprises cordierite, zirconium phosphate, or aluminum titanate.

In the first embodiment, the shape of the projection 31 of the plug 30 may be changed appropriately within the above predetermined range of the contact angle θ (about 91 to about 179 degrees) as shown in FIGS. 7(a) and 7(b).

In the first embodiment, plugs 30 of which the contact angle θ is not in the above predetermined range (about 90 degrees or less) may be used if this facilitates adjustment of the viscosity of the plug paste. For example, plugs 30 of which the contact angle θ of 90 degrees may be used as shown in FIG. 7(c). In this case, an outer portion of a second end surface 33 of the plug 30 is flat. Further, plugs 30 of which the contact angle θ is less than about 90 degrees may be used as shown in FIG. 7(d).

Figure 12A:
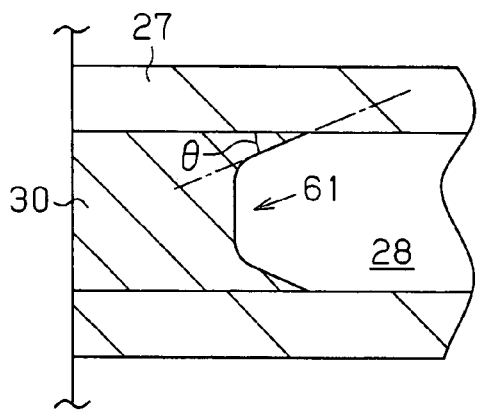
FIGS. 12(a) to (d) are cross-sectional views of plugs according to further examples of the second embodiment of the present invention.

In the second embodiment, the shape of the recess 61 may be changed within the above predetermined range of the contact angle θ (about 1 to about 50 degrees) as shown in FIG. 12(a).

Figure 12C:
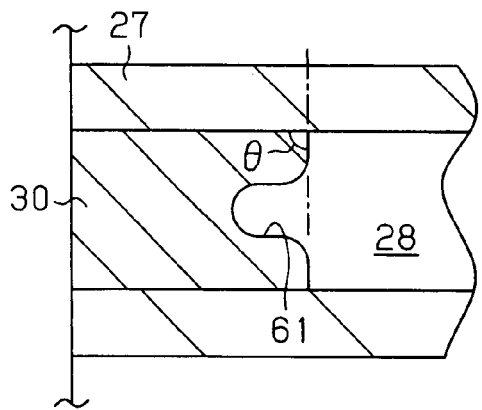
Figure 12B:
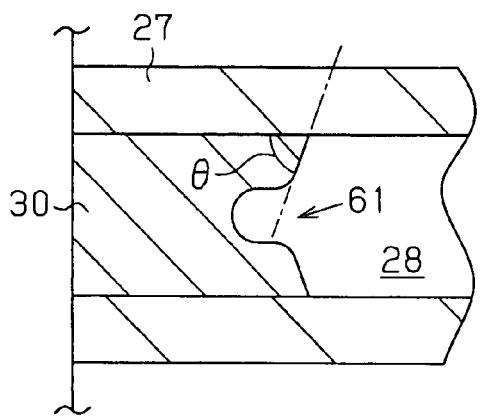
Figure 12D:
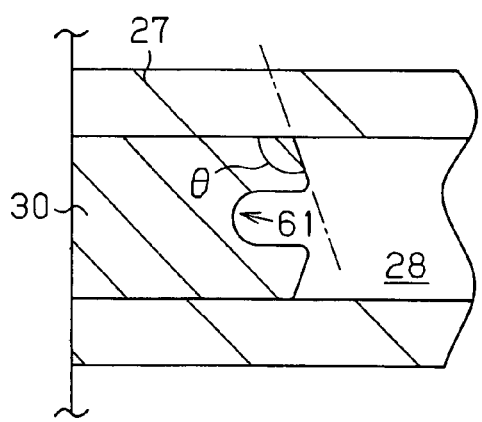

In the second embodiment, plugs 30 of which the contact angle θ is not in the above predetermined range (more than about 50 degrees) may be used as shown in FIGS. 12(b) to 12(d) if this facilitates adjustment of the viscosity of the plug paste. FIG. 12(b) shows a plug 30 of which the contact angle θ more than about 50 degrees and less than 90 degrees. FIG. 12(c) shows a plug 30 having the contact angle θ of 90 degrees. FIG. 12(d) shows a plug 30 having the contact angle θ more than 90 degrees.

The projections 31 may be eliminated from the plugs 30 in the first embodiment and the recesses 61 may be eliminated from the plugs 30 in the second embodiment if this facilitates adjustment of the viscosity of the plug paste. In this case, the entire second end surface 33 of the plug 30 is flat.

In the above embodiments, the coating layer 41 may be eliminated.

In the above embodiments, the honeycomb filter 21 is formed by bonding the honeycomb members 22. However, the honeycomb filter 21 may be formed by a single honeycomb member. In this case, the operation of bonding the honeycomb members 22 using the bonding material 24 is eliminated. This simplifies the manufacturing processes of the honeycomb filter 21.

In the above embodiments, the honeycomb filter 21 has a circular cross-section. However, the cross-section of the honeycomb filter 21 should not be limited to a circular cross-section and may be an oval cross-section or a polygonal cross-section such as a substantially triangular cross-section, a hexagonal cross-section, or an octagonal cross-section.

In the above embodiments, PM is burned and eliminated by the heat of the exhaust gas. However, PM may be burned and eliminated by a heating means, such as a heater or a burner, arranged in an exhaust gas purification device 10.

EXAMPLES

Test examples of the present invention and comparative examples will now be described.

Manufacture of the Honeycomb Filter

First, 7000 wt % of alpha silicon carbide particles having an average particle diameter of 10 μm and 3000 wt % of alpha silicon carbide particles having an average particle diameter of 0.5 μm were wet blended together. Then, 570 wt % of an organic binder (methyl cellulose) and 1770 wt % of water were added to 10000 wt % of the resulting mixture, which was kneaded to form a mixed composition. Then, 330 wt % of a reversible agent (UNILUB®) manufactured by NOF CORPORATION) and 150 wt % of a lubricant agent (glycerin) were added to the mixed composition, which was kneaded and extruded to form a honeycomb extruded body having a rectangular pillar shape shown in FIG. 3.

Next, the honeycomb extruded body was dried using for example a microwave drier to obtain a dried ceramic body. A plug paste was filled into the openings of predetermined cells. After the paste was dried with a drier, the dried ceramic body was degreased at 400° C. and was fired for three hours in an argon atmosphere at 2200° C. under normal pressure to manufacture a honeycomb member 22 having plugs 30 (FIG. 3) that is formed of a sintered silicon carbide. This honeycomb member 22 has the dimensions of 34.3×34.3×150 mm (height×width×length), a porosity of 42%, an average porous diameter of 11 μm, a cell density of 240 cells per square inch (cpsi), and a cell partition thickness of 0.3 mm.

A bonding material paste having a heat resistance was prepared separately. The bonding material paste was composed of 30 wt % of alumina fibers having an average fiber length of 20 μm and an average fiber diameter of 6 μm, 21 wt % of silicon carbide particles having an average particle diameter of 0.6 μm, 15 wt % of silica sol, 5.6 wt % of carboxymethyl cellulose, and 28.4 wt % of water. The bonding paste had a viscosity of 30 Pa·s (under room temperature).

Four rows and four columns of rectangular-pillar shape honeycomb members 22 were stacked together with a bonding material paste, dried for one hour at 100° C. to harden the bonding material paste. After the bonding material paste hardened, an aggregation S integrated by the bonding material 24 having a thickness of 1 mm was obtained. Cutting the outer peripheral surface of the aggregation S was carried out. A coating paste was applied to the cut outer periphery of the aggregation S to form a coating layer having a thickness of 1.0 mm. After drying the coating layer at 120° C., a cylindrical shape honeycomb filter 21 having a diameter of 140 mm and a length of 150 mm was manufactured. The coating paste used was prepared by kneading a composition comprising 23.3% by weight of alumina silicate ceramic fibers (shot content of 3%, average fiber length of 100 μm) serving as inorganic fibers, 30.2% by weight of silicon carbide particles (an average particle diameter of 0.3 μm) as inorganic particles, 7% by weight of silica sol serving as an inorganic binder (with an $SiO_2$ content of 30% by weight in the sol), 0.5% by weight of carboxymethyl cellulose serving as an organic binder, and 39% by weight of water.

Honeycomb filters 21 of A to G in table 1 each varying in the total content of the impurities in the material for the plugs 30 while having the same total content of the impurities in the material for the honeycomb structured body 23 were manufactured. Table 1 shows the total content of the impurities in the material for the honeycomb structured body 23 and the total content of the impurities in the maternal for the plugs 30. The content of each impurity was measured through fluorescent X-ray analysis. The numerical values in table 1 are in units of mass %.

The material for the plugs 30 of each of the honeycomb filters 21 was prepared to have the total content of the impurities of the values shown in table 1 with the same composition as the material for the honeycomb structured body described above. However, the mix ratio was changed or substances (auxiliary agent) containing the Al, Fe, B, Si, and free carbon (auxiliaries) were added.

The honeycomb filters 21 of two kinds were formed, one kind using the cells 28 with the plugs 30 having central projections 31 on their inner surfaces (FIGS. 5 and 7) and the other kind using the cells 28 with the plugs 30 having central recesses 61 on their inner surfaces (FIGS. 10 and 12). The sealing apparatus 51 shown in FIG. 8 was used to form the plugs 30 having the central projections 31. The immersion method shown in FIG. 13 was used to form the plugs 30 having the central recesses 61.

TABLE 1

| Impurity chemical elements | Amount of impurity element in honeycomb structured body | Amount of impurity element in plug (mass %) kinds of plug | | | | | | |
|---|---|---|---|---|---|---|---|---|
| | | A | B | C | D | E | F | G |
| Al | 0.08 | 0.08 | 0.08 | 0.11 | 0.11 | 0.08 | 0.08 | 0.11 |
| Fe | 0.17 | 0.17 | 0.27 | 0.20 | 0.20 | 0.27 | 0.27 | 0.20 |
| B | 0.01 | 0.01 | 0.01 | 0.18 | 0.18 | 0.06 | 0.18 | 0.18 |
| Si | 0.00 | 0.00 | 0.00 | 0.01 | 0.01 | 0.01 | 0.01 | 0.01 |
| Free C | 0.06 | 0.06 | 0.06 | 0.00 | 0.10 | 0.25 | 0.35 | 0.50 |
| Total | 0.32 | 0.32 | 0.42 | 0.50 | 0.60 | 0.67 | 0.89 | 1.00 |

<Evaluation Test of the Honeycomb Filter>

Test Examples 1 To 30 and Comparative Examples 1 to 5

The honeycomb filters 21 including the honeycomb structured bodies 23 and the plugs 30 shown in Table 2 were evaluated with regard to the correlation between the content of the impurities in the materials for the honeycomb structured body 23 and the plugs 30 and the plug durability. Table 2 shows the evaluation results. For the plugs 30 having the projections 31 formed at their central positions, the effect of the projections 31 on the plug durability was also evaluated.

Durability Test of the Plugs

The honeycomb filter 21 of each example was set in the exhaust gas purification device 10, and the exhaust gas purification test was carried out. In detail, the engine was driven at a speed of 3000 $min^{-1}$ and a torque of 50 Nm for a predetermined period of time to capture PM. Next, the engine was driven at a speed of 4000 $min^{-1}$ under full load. When the temperature of the honeycomb filter 21 became constant at around 700° C., the engine was driven at a speed of 1050 $min^{-1}$ and a torque of 30 Nm to forcibly burn PM. This operation was repeated every time when the captured amount of PM increased by 0.1 g/L. The maximum captured amount of PM was calculated within the range in which the plugs 30 did not crack at the boundary between the plugs 30 and the partitions 27, that is, at the outer side of the plugs 30. In the durability test, a greater value of the maximum captured amount of PM indicates that the plugs 30 are less likely to crack and thus have higher durability.

TABLE 2

| | Total of impurity content (mass %) | | | | | |
|---|---|---|---|---|---|---|
| | Honeycomb structured body | plug | kind of plug | Plug projection exists? | Contact angle θ (degree) | Maximum captured amout of PM (g/L) |
| Test example 1 | 0.32 | 0.42 | B | No | 90 | 6.0 |
| Test example 2 | 0.32 | 0.42 | B | Yes | 90 | 6.3 |
| Test example 3 | 0.32 | 0.42 | B | Yes | 91 | 7.5 |
| Test example 4 | 0.32 | 0.42 | B | Yes | 135 | 8.0 |
| Test example 5 | 0.32 | 0.42 | B | Yes | 179 | 7.5 |
| Test example 6 | 0.32 | 0.50 | C | No | 90 | 6.1 |
| Test example 7 | 0.32 | 0.50 | C | Yes | 90 | 6.4 |
| Test example 8 | 0.32 | 0.50 | C | Yes | 91 | 7.6 |
| Test example 9 | 0.32 | 0.50 | C | Yes | 135 | 8.2 |
| Test example 10 | 0.32 | 0.50 | C | Yes | 179 | 7.6 |
| Test example 11 | 0.32 | 0.60 | D | No | 90 | 6.2 |
| Test example 12 | 0.32 | 0.60 | D | Yes | 90 | 6.5 |
| Test example 13 | 0.32 | 0.60 | D | Yes | 91 | 7.7 |
| Test example 14 | 0.32 | 0.60 | D | Yes | 135 | 8.3 |
| Test example 15 | 0.32 | 0.60 | D | Yes | 179 | 7.5 |
| Test example 16 | 0.32 | 0.67 | E | No | 90 | 6.3 |
| Test example 17 | 0.32 | 0.67 | E | Yes | 90 | 6.6 |
| Test example 18 | 0.32 | 0.67 | E | Yes | 91 | 7.8 |
| Test example 19 | 0.32 | 0.67 | E | Yes | 135 | 8.4 |
| Test example 20 | 0.32 | 0.67 | E | Yes | 179 | 7.6 |
| Test example 21 | 0.32 | 0.89 | F | No | 90 | 6.4 |
| Test example 22 | 0.32 | 0.89 | F | Yes | 90 | 6.7 |
| Test example 23 | 0.32 | 0.89 | F | Yes | 91 | 7.9 |
| Test example 24 | 0.32 | 0.89 | F | Yes | 135 | 8.6 |
| Test example 25 | 0.32 | 0.89 | F | Yes | 179 | 7.7 |
| Test example 26 | 0.32 | 1.00 | G | No | 90 | 6.5 |
| Test example 27 | 0.32 | 1.00 | G | Yes | 90 | 6.8 |
| Test example 28 | 0.32 | 1.00 | G | Yes | 91 | 8.0 |
| Test example 29 | 0.32 | 1.00 | G | Yes | 135 | 8.7 |
| Test example 30 | 0.32 | 1.00 | G | Yes | 179 | 7.8 |
| Comp. Exp. 1 | 0.32 | 0.32 | A | No | 90 | 5.5 |
| Comp. Exp. 2 | 0.32 | 0.32 | A | Yes | 90 | 5.5 |
| Comp. Exp. 3 | 0.32 | 0.32 | A | Yes | 91 | 5.5 |
| Comp. Exp. 4 | 0.32 | 0.32 | A | Yes | 135 | 5.5 |
| Comp. Exp. 5 | 0.32 | 0.32 | A | Yes | 179 | 5.5 |

Measurement of Contact Angle θ: The cross-section of the plug 30 was photographed using an optical microscope, and the contact angle θ was calculated using the photograph. The "cross-section" refers to a cross-section parallel to the center axis X of the cell 28.

As shown in table 2, the plugs 30 in test examples 1 to 30 have higher durability than comparative examples 1 to 5. It is believed that this is because the honeycomb filters 21 of the test examples use the plugs 30 having a greater total content of the impurities than the honeycomb structured bodies 23 and consequently have a high durability and a sufficiently high strength. In this manner, it is believed that the plugs 30 of the examples having a greater content of the impurities (test examples 26 to 30) have a higher heat resistance and a higher strength.

When test example 1 is compared with test examples 2 to 5, the plugs 30 in test examples 2 to 5 have a higher durability than test example 1. It is believed that this is because the plugs 30 in test examples 2 to 5 have the projections 31 that function to reduce thermal expansion at the outer side and the plugs 30 in test example 1 do not have the projections 31. Further, as test examples 13 and 14 indicate, the durability of the plugs 30 is particularly high when the contact angle θ is about 91 to about 135 degrees. It is believed that this shows that thermal expansion generated at the boundary between the plugs 30 and the partitions 27 is more easily reduced when the contact angle θ is about 91 to about 135 degrees.

Test Examples 31 to 66 And Comparative Examples 6 to 11

The honeycomb filters 21 having the honeycomb structured bodies 23 and the plugs 30 shown in Table 3 were evaluated with regard to the correlation between the content of the impurities in the materials for the honeycomb structured body 23 and the plugs 30 and the plug durability. The plug durability described above was evaluated for the honeycomb filter 21 of each example. Table 3 shows the evaluation results. For the plugs 30 having the recesses 61 at their central positions, the effect of the recesses 61 on the plug durability was also evaluated.

As shown in Table 3, the plugs 30 in test examples 31 to 66 have a higher durability than comparative examples 6 to 11. It is believed that this is because the honeycomb filters 21 of the test examples use the plugs 30 having a greater total content of the impurities than the honeycomb structured bodies 23 and consequently have a sufficiently high durability and a sufficiently high strength. In particular, it is believed that the plugs 30 in the examples having a greater content of the impurities (test examples 61 to 66) have a higher heat resistance and a higher strength.

When test example 31 is compared with test examples 32 to 36, the plugs 30 in test examples 32 to 36 have a higher durability than test example 31. It is believed that this is because the plugs 30 in test examples 32 to 36 have the recesses 60 that function to reduce stress generated by thermal shock of the plugs 30, and the plugs 30 in test example 31 do not have the recesses 60. Further, as test examples 45 and 46 indicate, the durability of the plugs 30 is particularly high when the contact angle θ is about 1 to about 30 degrees. It is believed that this indicates that stress generated at the boundary between the plugs 30 and the partitions 27 is more easily reduced when the contact angle θ is about 1 to about 30 degrees.

TABLE 3

|  | Total of impurity content (mass %) | | kind of plug | Plug recess exists? | Contact angle θ (degree) | Maximum captured amount of PM (g/L) |
| --- | --- | --- | --- | --- | --- | --- |
|  | Honeycomb structured body | plug | | | | |
| Test example 31 | 0.32 | 0.42 | B | No | 90 | 6.0 |
| Test example 32 | 0.32 | 0.42 | B | Yes | 0.5 | 6.3 |
| Test example 33 | 0.32 | 0.42 | B | Yes | 1 | 7.5 |
| Test example 34 | 0.32 | 0.42 | B | Yes | 30 | 8.0 |
| Test example 35 | 0.32 | 0.42 | B | Yes | 45 | 7.5 |
| Test example 36 | 0.32 | 0.42 | B | Yes | 50 | 6.5 |
| Test example 37 | 0.32 | 0.50 | C | No | 90 | 6.1 |
| Test example 38 | 0.32 | 0.50 | C | Yes | 0.5 | 6.4 |
| Test example 39 | 0.32 | 0.50 | C | Yes | 1 | 7.6 |
| Test example 40 | 0.32 | 0.50 | C | Yes | 30 | 8.2 |
| Test example 41 | 0.32 | 0.50 | C | Yes | 45 | 7.6 |
| Test example 42 | 0.32 | 0.50 | C | Yes | 50 | 6.5 |
| Test example 43 | 0.32 | 0.60 | D | No | 90 | 6.2 |
| Test example 44 | 0.32 | 0.60 | D | Yes | 0.5 | 6.5 |
| Test example 45 | 0.32 | 0.60 | D | Yes | 1 | 7.7 |
| Test example 46 | 0.32 | 0.60 | D | Yes | 30 | 8.3 |
| Test example 47 | 0.32 | 0.60 | D | Yes | 45 | 7.5 |
| Test example 48 | 0.32 | 0.60 | D | Yes | 50 | 6.6 |
| Test example 49 | 0.32 | 0.67 | E | No | 90 | 6.3 |
| Test example 50 | 0.32 | 0.67 | E | Yes | 0.5 | 6.6 |
| Test example 51 | 0.32 | 0.67 | E | Yes | 1 | 7.8 |
| Test example 52 | 0.32 | 0.67 | E | Yes | 30 | 8.4 |
| Test example 53 | 0.32 | 0.67 | E | Yes | 45 | 7.6 |
| Test example 54 | 0.32 | 0.67 | E | Yes | 50 | 6.7 |
| Test example 55 | 0.32 | 0.89 | F | No | 90 | 6.4 |
| Test example 56 | 0.32 | 0.89 | F | Yes | 0.5 | 6.7 |
| Test example 57 | 0.32 | 0.89 | F | Yes | 1 | 7.9 |
| Test example 58 | 0.32 | 0.89 | F | Yes | 30 | 8.6 |
| Test example 59 | 0.32 | 0.89 | F | Yes | 45 | 7.7 |
| Test example 60 | 0.32 | 0.89 | F | Yes | 50 | 6.9 |
| Test example 61 | 0.32 | 1.00 | G | No | 90 | 6.5 |
| Test example 62 | 0.32 | 1.00 | G | Yes | 0.5 | 6.8 |
| Test example 63 | 0.32 | 1.00 | G | Yes | 1 | 8.0 |
| Test example 64 | 0.32 | 1.00 | G | Yes | 30 | 8.7 |
| Test example 65 | 0.32 | 1.00 | G | Yes | 45 | 7.8 |
| Test example 66 | 0.32 | 1.00 | G | Yes | 50 | 7.0 |
| Comp. Exp. 6 | 0.32 | 0.32 | A | No | 90 | 5.5 |
| Comp. Exp. 7 | 0.32 | 0.32 | A | Yes | 0.5 | 5.5 |
| Comp. Exp. 8 | 0.32 | 0.32 | A | Yes | 1 | 5.5 |
| Comp. Exp. 9 | 0.32 | 0.32 | A | Yes | 30 | 5.5 |
| Comp. Exp. 10 | 0.32 | 0.32 | A | Yes | 45 | 5.5 |
| Comp. Exp. 11 | 0.32 | 0.32 | A | Yes | 50 | 5.5 |

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A honeycomb filter, comprising:

at least one pillar-shape honeycomb structured body having a plurality of cells separated by partitions; and plugs for sealing upstream openings of a plurality of first cells selected from the plurality of cells and for sealing downstream openings of a plurality of second cells selected from the plurality of cells, wherein a material forming the plugs and a material forming the honeycomb structured body both contain impurities selected from the group consisting of aluminum, iron, boron, silicon, and free carbon, and the total content of impurities in the material forming the plugs is higher than the total content of impurities in the material forming the honeycomb structured body.

2. The honeycomb filter according to claim 1, wherein each of the plugs has a first end surface adjacent to an opening of the cell in which the plug resides and a second end surface opposite to the first end surface, and the distance from the first end surface to the second end surface in a direction parallel to a center axis of the cell is not constant.

3. The honeycomb filter according to claim 1, wherein each of the plugs has a first end surface adjacent to an opening of the cell in which the plug resides and a second end surface opposite to the first end surface, and wherein the second end surface has a recess.

4. The honeycomb filter according to claim 3, wherein an end surface of each of the plugs forms a contact angle with a partition in a cross section of the plug along a center axis of the cell in which the plug resides, and the contact angle is about 1 to about 50 degrees.

5. The honeycomb filter according to claim 4, wherein the contact angle is about 1 to about 45 degrees.

6. The honeycomb filter according to claim 4, wherein the contact angle is about 1 to about 30 degrees.

7. The honeycomb filter according to claim 1, wherein each of the plugs has a first end surface adjacent to an opening of the cell in which the plug resides and a second end surface opposite to the first end surface, and wherein the second end surface has a projection.

8. The honeycomb filter according to claim 7, wherein an end surface of the plug forms a contact angle with a partition in a cross section of the plug along a center axis of the cell in which the plug resides, and the contact angle is about 91 to about 179 degrees.

9. The honeycomb filter according to claim 8, wherein the contact angle is about 91 to about 135 degrees.

10. The honeycomb filter according to claim 2, wherein a distance between the first end surface and the second end surface of the plug in a direction parallel to the center axis of the cell varies, and the difference between the maximum value of the distance and the minimum value of the distance is about fifteen times or less the thickness of the partition.

11. The honeycomb filter according to claim 10, wherein the difference between a maximum value and a minimum value of the distance is about ten times or less the thickness of the partition.

12. The honeycomb filter according to claim 1, wherein the honeycomb structured body comprises at least one material selected from the group consisting of cordierite, zirconium phosphate, aluminum titanate, silicon carbide, and a silicon metal-silicon carbide composite.

13. The honeycomb filter according to claim 1, wherein at least part of the partition carries a catalyst.

14. The honeycomb filter according to claim 1, wherein the honeycomb structured body is formed by bonding a plurality of honeycomb structured body with a bonding material, wherein each honeycomb member having an outer wall, and partitions arranged inward from the outer wall, and a plurality of cells separated by the partitions which serve as flow passages for fluid.

15. The honeycomb filter according to claim 1, further comprising a coating layer applied on an outer circumference of the honeycomb structured body.

16. The honeycomb filter according to claim 1, wherein the total content of aluminum, iron, boron, silicon, and free carbon in the material forming the plugs is more than about 0.35 mass %.

17. The honeycomb filter according to claim 16, wherein the total content of aluminum, iron, boron, silicon, and free carbon in the material forming the plugs is about 1.5 mass % or less.

18. The honeycomb filter according to claim 1, wherein the honeycomb filter is a monolithic-type honeycomb structure body having a single honeycomb structured body without a bonding layer.

19. The honeycomb filter according to claim 18, wherein the monolithic-type honeycomb structure body comprises cordierite, zirconium phosphate, or aluminum titanate.

* * * * *